United States Patent [19]

Comstock et al.

[11] Patent Number: 4,506,321
[45] Date of Patent: Mar. 19, 1985

[54] MOTION CONTROL SYSTEM WITH ADAPTIVE DECELERATION

[75] Inventors: Robert H. Comstock, Andover; William P. Curtiss, Winthrop; Donald E. Fulton, Stoneham, all of Mass.

[73] Assignee: IMEC Corporation, Boston, Mass.

[21] Appl. No.: 416,357

[22] Filed: Sep. 8, 1982

[51] Int. Cl.³ .............................................. G05B 13/00
[52] U.S. Cl. .................................. 364/174; 318/571; 318/561
[58] Field of Search ............... 364/174, 167, 183, 400; 318/561, 571, 39, 593

[56] References Cited

U.S. PATENT DOCUMENTS

| | | | |
|---|---|---|---|
| 3,569,681 | 6/1967 | Koepcke | 235/150.1 |
| 3,629,560 | 12/1971 | Slawson | 318/561 |
| 3,720,120 | 9/1970 | Cutler | 82/2 |
| 3,784,798 | 1/1974 | Beadle et al. | 235/151.11 |
| 3,811,345 | 5/1974 | Kobayashi et al. | 82/2 B |
| 3,849,712 | 11/1974 | Lankford et al. | 318/561 |
| 3,873,816 | 3/1975 | Takeyama et al. | 235/151.11 |
| 3,876,873 | 4/1975 | Slawson | 364/174 |
| 3,911,347 | 10/1975 | Hartung | 318/632 |
| 3,918,045 | 11/1975 | Morser et al. | 364/167 |
| 3,941,987 | 3/1976 | Tack, Jr. | 364/174 |
| 3,952,238 | 4/1976 | Cutler | 318/561 |
| 4,025,837 | 5/1977 | Meier et al. | 318/561 |
| 4,061,952 | 12/1977 | Dinsdale et al. | 318/572 |
| 4,197,576 | 4/1980 | Sanchez | 364/106 |
| 4,223,257 | 9/1980 | Miller | 318/594 |
| 4,311,945 | 1/1982 | Aoyama | 318/561 |
| 4,342,077 | 7/1982 | Passey et al. | 364/174 |
| 4,376,970 | 3/1983 | Ilseman et al. | 364/174 |
| 4,404,505 | 9/1983 | Swanson et al. | 318/561 |
| 4,439,825 | 3/1984 | Donner | 364/174 |

Primary Examiner—Jerry Smith
Assistant Examiner—Karl Huang
Attorney, Agent, or Firm—Barry E. Sammons

[57] ABSTRACT

A microprocessor-based motor control system operates the rapid advance motor on a slide transfer machine to carry out rapid traverse motions in minimal time. A velocity profile is stored during the acceleration portion of the move and this data is employed to determine when deceleration should begin and to control velocity during the deceleration portion of the move. A position feedback circuit having programmable resolution is employed to develop the velocity profile.

9 Claims, 15 Drawing Figures

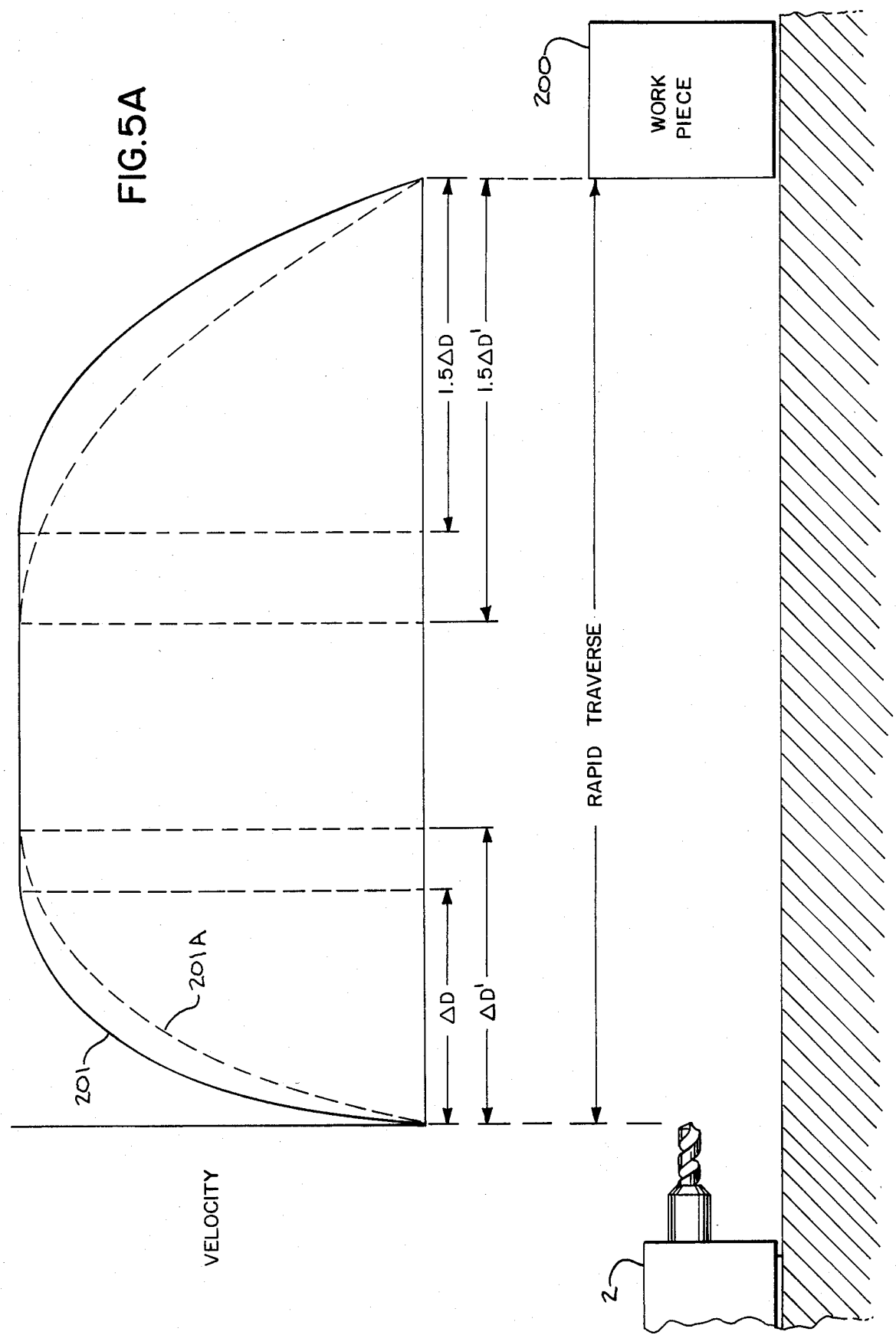

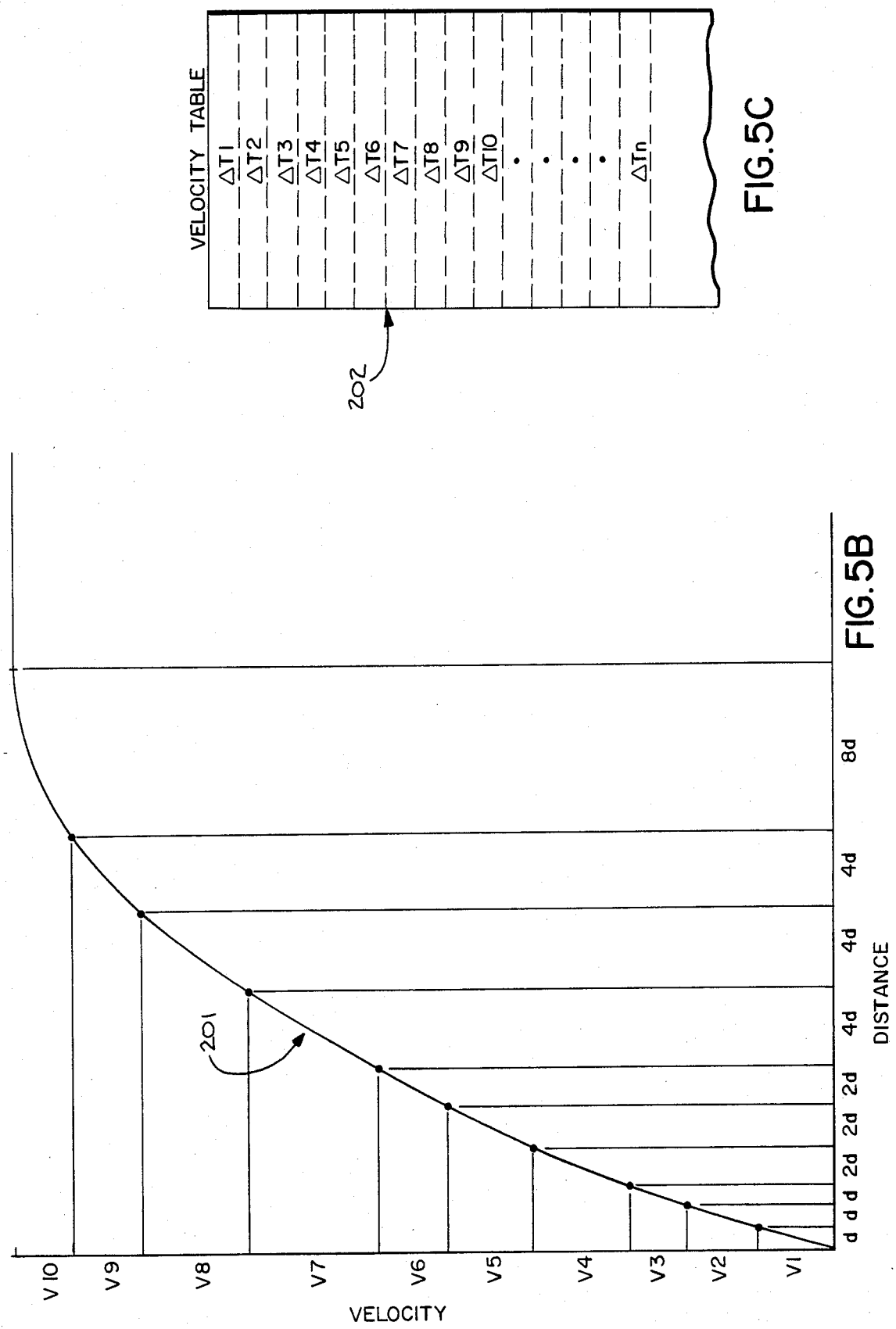

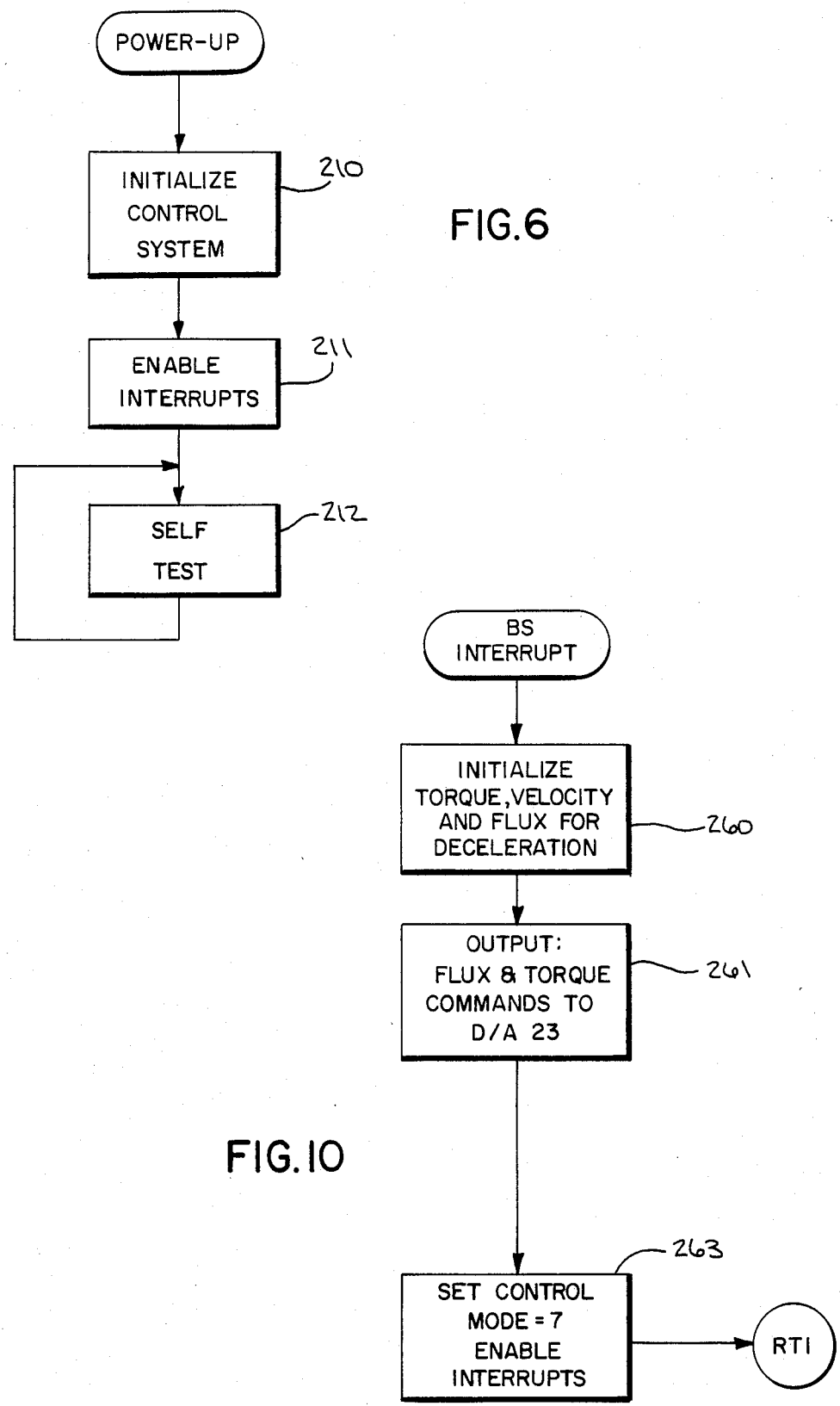

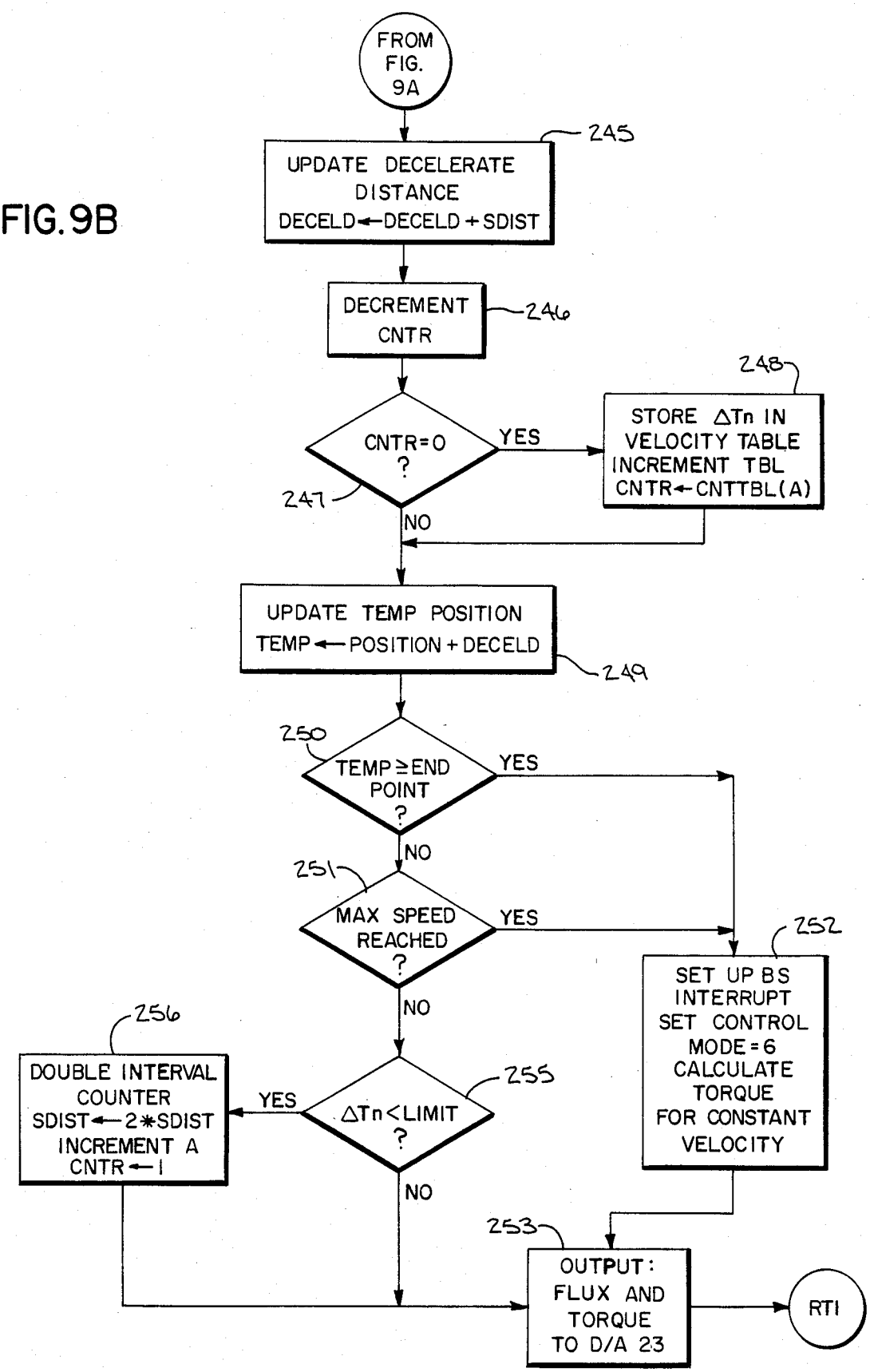

4,506,321

MOTION CONTROL SYSTEM WITH ADAPTIVE DECELERATION

BACKGROUND OF THE INVENTION

The field of the invention is closed-loop motor control systems, and particularly, systems for controlling the position of movable members on machine tools and the like.

There are numerous position control systems for moving a machine element from one designated point to another. In numerical control systems for example, a series of such moves are stored as digital data which is input to the control system. Such digital data may not only indicate the position to which the movable element is to be driven, but it may also indicate the velocity of the move and the acceleration and deceleration limits of the machine. Feedback devices coupled to the machine provide the position, velocity and acceleration feedback information necessary to maintain the indicated values.

There are numerous instances in which it is desirable to move the machine element as rapidly as possible to a desired position. Such rapid travel is advantageous, for example, when the machine element is being moved into a position from which the actual machining operation can begin. In such rapid moves it is desirable to accelerate and decelerate the movable machine element at the maximum rate possible to minimize the length of time required to make these non-productive moves. Unfortunately, the limit of the machine's capabilities is not known, and in fact, may vary considerably with time, temperature and load. Consequently, the control system is usually "programmed" to accelerate and decelerate the movable element at a reduced, but assured rate.

SUMMARY OF THE INVENTION

The present invention relates to an adaptive control system in which the performance of the controlled machine is measured during the acceleration portion of a move, and the information obtained from this measurement is employed to determine the performance level of the controlled machine during the deceleration portion of the move. The control system includes: drive means for accelerating a movable element on a controlled machine to a desired velocity and decelerating the movable element to bring it to a desired end point; sensor means coupled to sense the motion of the movable element and generate a corresponding feedback signal; storage means coupled to the sensor means for storing performance data derived from the feedback signal generated during the acceleration of the movable element; and means responsive to the stored performance data for initiating the deceleration portion of the move.

A general object of the invention is to minimize the time required to move a machine element between two positions. A velocity profile is generated during the acceleration portion of the move which indicates the acceleration ability of the motor drive and the machine. The assumption is made that the motor drive and machine can maintain this performance capability during the deceleration portion of the move. Accordingly, the acceleration velocity profile data is used to determine the exact moment when deceleration should start and the rate at which deceleration should occur to smoothly halt at the desired end point.

Another object of the invention is to provide an incremental position feedback circuit which has a large operating range. When the machine element is moving slowly, the incremental feedback pulses generated by a position transducer are at a relatively low rate and can be separately employed by the control system. At higher velocities, however, the pulse repetition rate is too high for the control system to process separately. The feedback circuit of the present invention accumulates feedback pulses and produces an incremental feedback pulse to the control system only after a preset number are accumulated. The preset number is increased as machine velocity increases to reduce the resolution of the feedback circuit.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 5A is a graphic representation of a rapid move velocity profile which is employed to explain the operation of the control system of FIG. 1;

FIG. 5B is a graphic representation of the acceleration portion of the profile of FIG. 5A;

FIG. 5C is a schematic representation of a velocity table which forms part of the control system of FIG. 1;

FIG. 6 is a flow chart of the background program executed by the microprocessor of FIG. 2;

FIGS. 9A and 9B are a flow chart of an interval interrupt service routine which is executed by the microprocessor of FIG. 2; and FIG. 10 is a flow chart of a BS interrupt service routine which is executed by the microprocessor of FIG. 2.

DESCRIPTION OF THE PREFERRED EMBODIMENT

Figure 1:
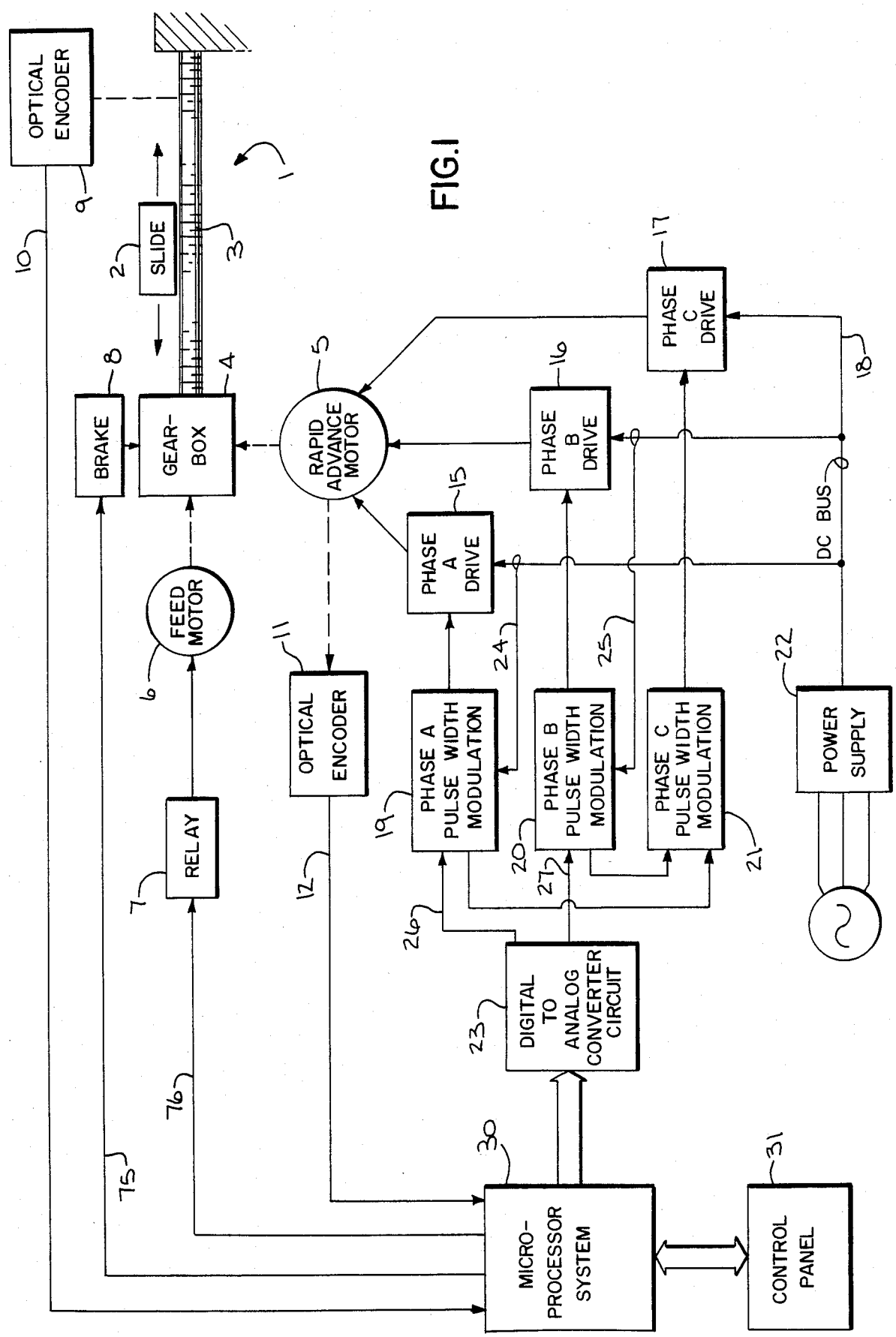
FIG. 1 is a block diagram of a control system which employs the present invention.

Referring particularly to FIG. 1, the control system is employed to operate a slide transfer machine 1 which includes a slide 2 that is driven along a horizontal axis by a lead screw 3. The lead screw 3 is rotated through a gear box 4 by a rapid advance motor 5 and a feed motor 6. The gear box 4 provides a low speed reduction ratio for the rapid advance motor 5 and a high speed reduction ratio for the feed motor 6. The feed motor 6 is operated by a relay 7 and when the relay 7 is energized, the feed motor 6 provides low speed, high torque drive for the lead screw 3.

As will be described in more detail below, the rapid advance motor 5 is a three-phase induction motor which is driven at variable speed and torque. The motor 5 provides relatively low torque, high speed drive for the lead screw 3, and when the motor 5 comes to a stop, a brake 8 is engaged to hold the rapid advance motor 5 stationary. An optical encoder 9 is mechanically coupled directly to the lead screw 3 to provide a position feedback signal through line 10, and an optical encoder 11 couples to the rapid advance motor 5 to provide an incremental feedback signal through line 12.

In a typical machining cycle the feed motor 6 is energized and the brake 8 is released. The rapid advance motor 5 is then accelerated to move the slide 2 as quickly as possible from a home position to a machining position. When the machining position is reached, the rapid advance motor 5 is brought to a stop, the brake 8 is engaged, and the feed motor 6 advances the slide during the machining portion of the cycle. When machining is completed the brake 8 is released and the rapid advance motor 5 is driven in the reverse direction to return the slide 2 to its home position as rapidly as possible.

While the invention is employed in the preferred embodiment to drive the rapid advance motor 5 during the rapid advance and rapid retract portion of the slide transfer machine cycle, it can be appreciated that the invention may also be applied to other machines such as milling machines, lathes, grinders, robots and sheet feeders. Indeed, the invention is applicable to nearly any machine in which a movable element is to be moved at the maximum rate possible between two positions. The adaptive aspects of the control system of the present invention are particularly advantageous when applied to slide transfer machines because their operating characteristics, both mechanical and electrical, may vary considerably with temperature and use.

The rapid advance motor 5 is driven by a three-phase, transistorized, pulse width modulated induction motor drive. This induction motor drive includes three transistorized drive modules 15–17 which connect to a d.c. bus 18 and which are separately operated by respective pulse width modulator (PWM) modules 19–21. Power is supplied to the d.c. bus 18 through a power supply 22, and the PWM modules 19–21 operate the drive modules 15–17 to control the magnitude of the current applied to each phase winding of the rapid advance motor 5, as well as the frequency of this current.

The PWM modules 19 and 20 receive current command signals (Io SIN wt and Io SIN (wt+120°)) from a digital to analog converter circuit 23, and current feedback signals through respective lines 24 and 25. As described in U.S. Pat. No. 4,306,182 entitled "Polyphase Motor Drive System With Balanced Modulation", the third PWM module 21 is driven by the inverted sum of the current error signals from the other two phases to insure that balanced multiphase excitation currents are applied to the rapid advance motor 5. The current command signals generated by the converter 23 on lines 26 and 27 are sinusoidal and are 120 degrees out of phase. Their amplitude (Io) and frequency (w) indicate the motor torque and motor speed which is commanded by a microprocessor system 30.

As will be explained in more detail below, the microprocessor system 30 executes a stored control program to drive the slide transfer machine 1 through the steps of the machining cycle. The microprocessor system 30 receives slide position feedback data from the optical encoder 9 and motor angle feedback data from the optical encoder 11 and generates motor flux, motor torque and motor excitation phase angle command data. This command data is applied in the form of digital signals to the digital to analog converter circuit 23.

The control program which the microprocessor system 30 executes may be entered and edited through a control panel 31. The control panel 31 also includes selector switches and indicator lights which are employed to select and display the mode of operation.

Figure 2:
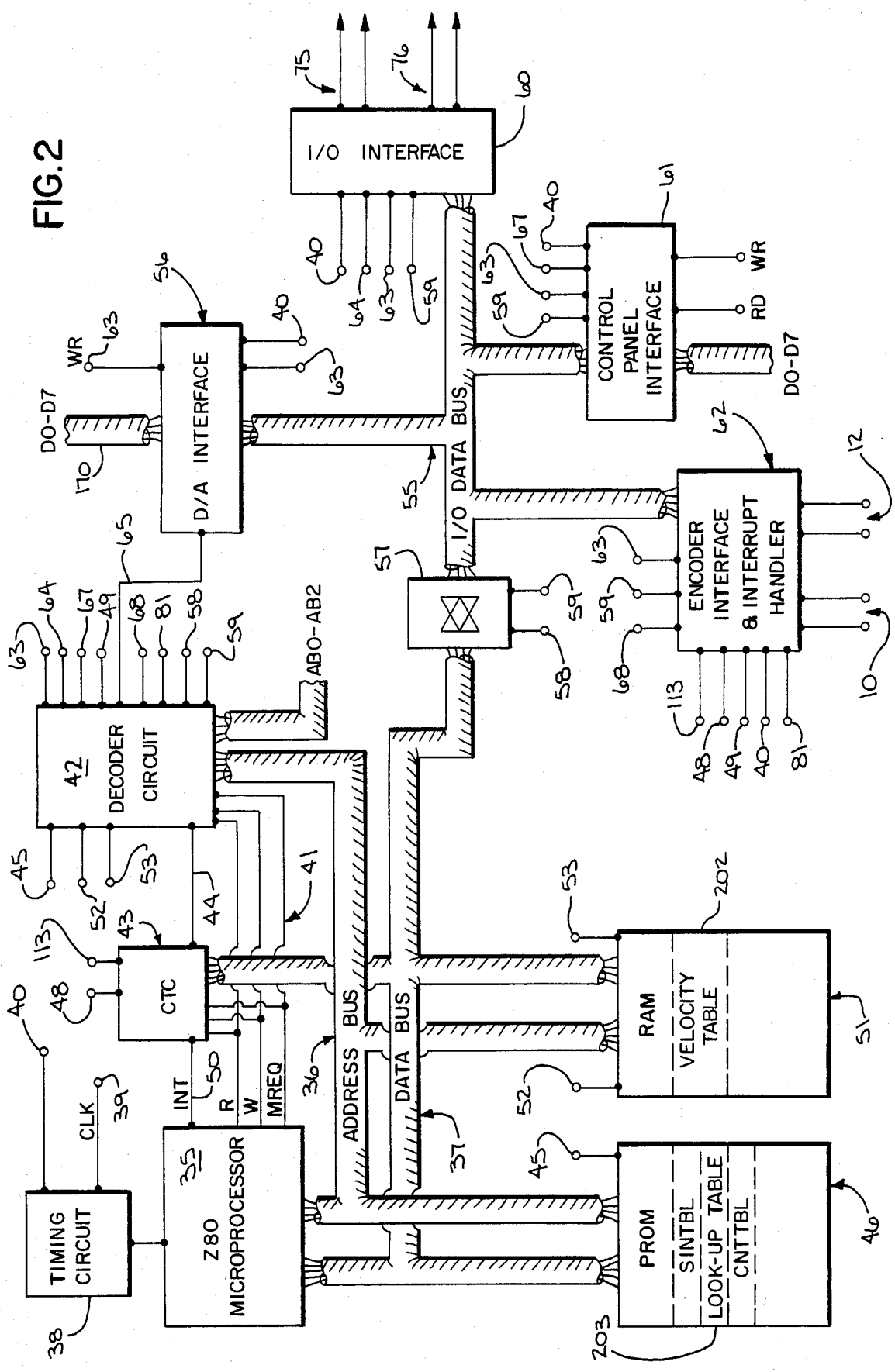
FIG. 2 is an electrical schematic diagram of the microprocessor system which forms part of the control system of FIG. 1.

Referring to FIG. 2, the microprocessor system 30 is structured about an 8-bit microprocessor 35 which drives a 16-bit address bus 36 and an 8-bit data bus 37. A Z-80 microprocessor manufactured by Zilog, Inc. is employed and it is driven by a 4 megahertz clock generated by a timing circuit 38. The timing circuit 38 also generates a 2 megahertz clock signal on a CLK line 39 and a timing signal on STROBE line 40, both of which are used throughout the microprocessor system 30.

The microprocessor 35 also drives a set of control lines 41 which connect to a decoder circuit 42 and a counter timer circuit 43. The decoder circuit 42 employs conventional decoder circuitry to enable control lines which operate the various elements of the microprocessor system 30. The particular control line which is enabled is determined by the address present on the address bus 36 and the state of the microprocessor control lines 41. For example, a CTC EN control line 44 may be driven low to enable the counter timer circuit 43 or a CE control line 45 may be driven low to enable a programmable read-only memory (PROM) 46.

The counter timer circuit 43 is connected to the data bus 37 and it is initialized during power-up to prioritize interrupt requests received on INT1 and INT2 control lines 113 and 48. When such an interrupt request is received, the counter timer circuit 43 generates an interrupt request to the microprocessor 35 through INT control line 50, and the microprocessor 35 responds by reading the highest priority interrupt vector from the counter timer circuit 43. The interrupt vector directs the microprocessor to an appropriate interrupt service routine stored in the PROM 46 which is then executed to service the interrupt.

The PROM 46 is comprised of eight thousand 8-bit words which store the programs that direct the microprocessor 35 to carry out the functions performed by the microprocessor system 30. The PROM 46 also stores certain constants employed by such programs. These programs and the functions which they perform will be described in more detail below.

A random access, read-write memory (RAM) 51 is also connected to the address bus 36 and data bus 37, and it is employed to store data which is used during the execution of the programs. The RAM 51 is comprised of 1.024 thousand 8-bit words and it is enabled when a RAM EN control line 52 is driven low by the decoder circuit 42. Data is written to an addressed location in the RAM 51 when a WR control line 53 is driven low by the decoder circuit 42 and data is read from the addressed location when this control line 53 is at a logic high voltage.

Referring still to FIG. 2, the data bus 37 communicate with a number of interface circuits which couple the microprocessor system 30 to the remainder of the control system. A set of eight bi-directional gates 57 buffer the data bus 37 and connect it to an I/O data bus 55. When a CS I/O control line 58 is enabled by the decoder circuit 42 and a RD control line 59 is driven low, data is input through the I/O data bus 55 from either a D/A interface circuit 56, an I/O interface circuit 60, control panel interface 61, or an encoder interface and interrupt handler circuit 62. On the other hand, if the RD control line 59 is high when the gates 57 are enabled, data is output to the I/O data bus 55.

The interface circuits connected to the I/O data bus 55 are separately enabled by control lines driven by the decoder circuit 42 and by the STROBE control line 40 which is driven by the timing circuit 38. The RD control line 59 and a WR control line 63 connect to each interface circuit 56 and 60-62, and their state determines whether data is input or output from the microprocessor system 30. The microprocessor system 30 thus employs memory mapped I/O in which addresses on the address bus 36 are decoded along with signals on the control lines 41 to read or write from designated I/O interface circuits.

Referring to FIGS. 1 and 2, the I/O interface circuit 60 is comprised of a.c. output circuits wich are commercially available in modules containing eight circuits such as that disclosed in U.S. Pat. No. 3,745,546. One of these a.c. output circuits drives a pair of lines 75 which energize and de-energize the brake 8 and another a.c. output circuit drives a pair of lines 76 which operate the relay 7. The operation of both the relay 7 and brake 8 is thus under the control of the microprocessor system 30.

The control panel interface 61 is comprised of bi-directional gates which buffer the RD and WR control lines 59 and 63 and the I/O data bus 55. Data may thus be gated out to the control panel 31 to energize indicator lights, and data may be input through the circuit 61 from switches on the control panel 31.

The D/A interface circuit 56 is similarly constructed to buffer the WR control line 63 and the data bus 55. As will be described in more detail below, data may be output through the D/A interface circuit 56 to one of six digital to analog converters in the digital to analog converter circuit 23. Select leads AB0-AB2 indicate which of the converters is to receive the eight-bit byte of data being output.

Figure 3A:
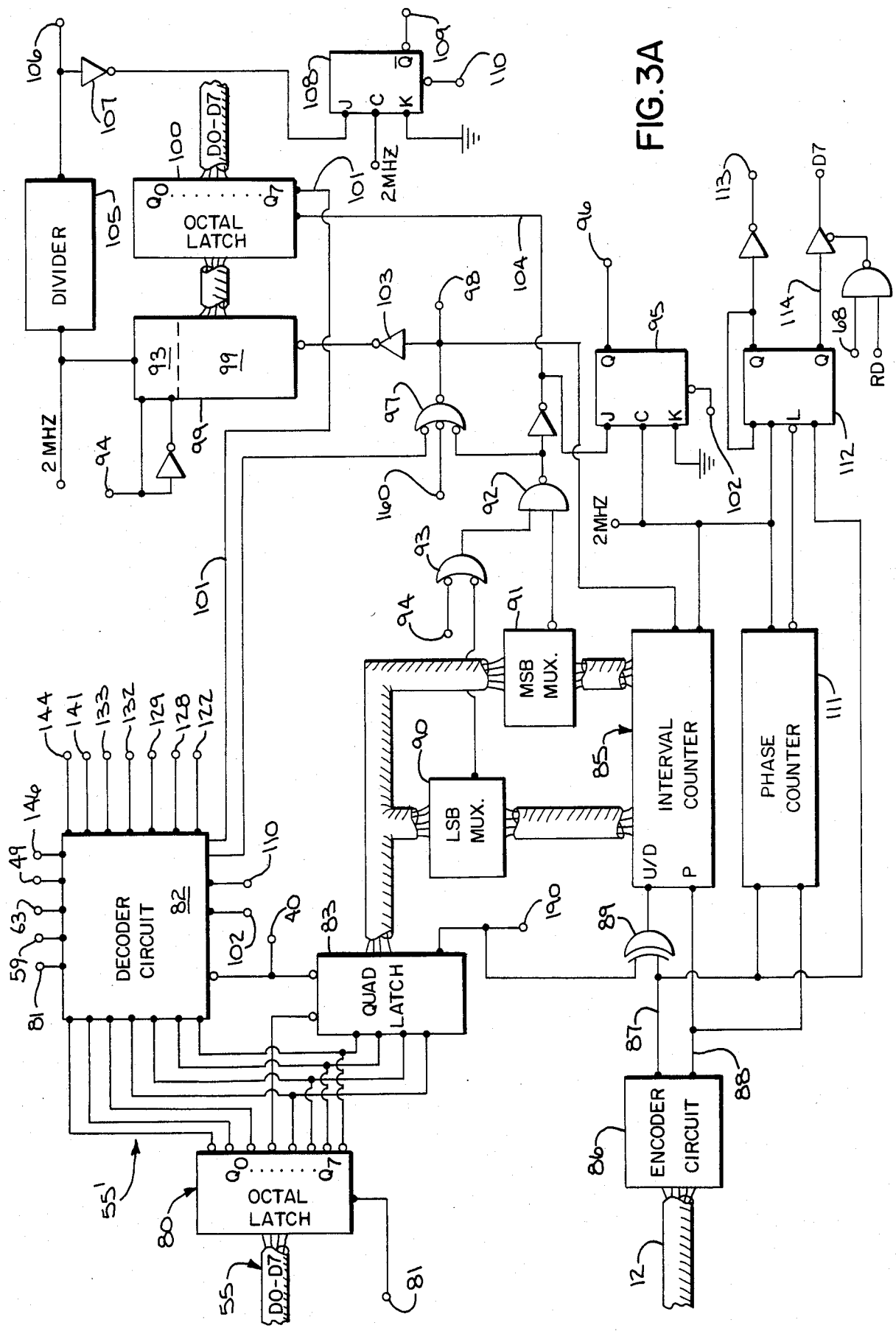
FIGS. 3A and 3B are an electrical schematic diagram of the encoder interface and interrupt handler circuit which forms part of the system of FIG. 2.
Figure 3B:
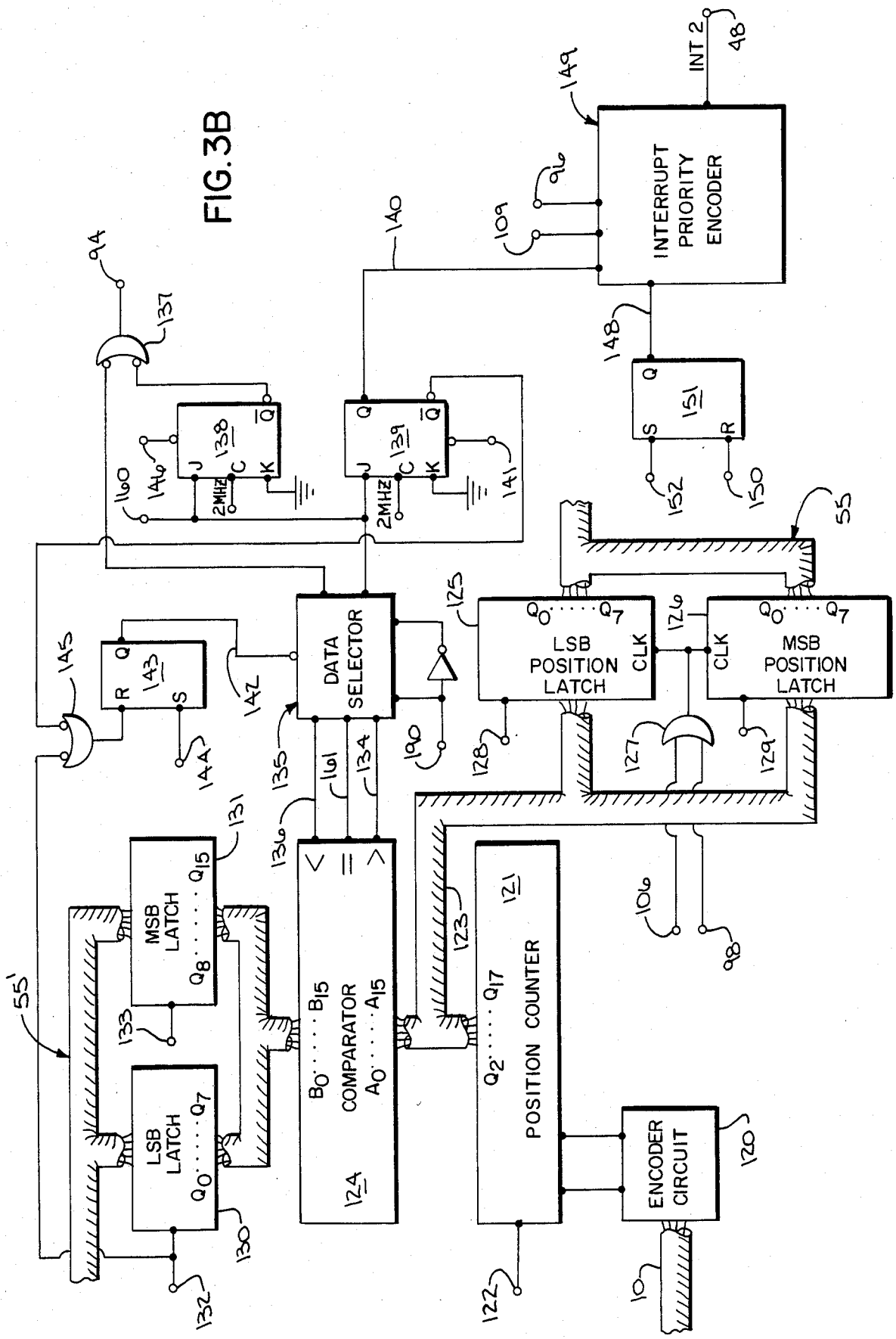

Referring particularly to FIGS. 2, 3A and 3B, the encoder interface and interrupt handler circuit 62 performs a variety of functions. Data can be written to it or read from it through the I/O data bus 55. The circuit 62 can also generate interrupt requests on the INT1 and INT2 lines 113,48 to the counter timer circuit 43. In addition to the handling of interrupts, the circuit 62 is primarily responsible for processing feedback information received from the optical encoders 9 and 11 through lines 10 and 12.

Referring particularly to FIGS. 2 and 3A, the encoder interface and interrupt handler circuit 62 includes an octal latch 80 which connects to the I/O data bus 55 and is clocked when an FSTROBE control line 81 is enabled. The eight outputs of the latch 80 form an extended I/O bus 55'. This bus 55' drives a decoder circuit 82 and five of its eight outputs drive a quad latch 83. The STROBE control line 40 enables the decoder 82 and quad latch 83 when "control data" is output by the microprocessor 35 to the encoder interface and interrupt handler circuit 62. Such control data is decoder to select control lines which operate the various elements of the circuit 62.

One such element is an interval counter 85 which is a 10-bit binary counter that counts the incremental feedback pulses received from the optical encoder 11 through the line 12. The feedback pulses from the encoder 11 are in the form of two phase-displaced pulse trains which are applied to an encoder circuit 86 such as that disclosed in U.S. Pat. No. 3,646,360. The output of the encoder circuit 86 is a logic signal on line 87 which indicates the direction in which the rapid advance motor 5 is rotating and a pulse train on line 88 which is applied to the input of the interval counter 85. Each cycle of the encoder 11 produces four pulses on the line 88, and the optical encoder 11 cycles once for every 0.175 degrees of rotation of the rapid advance motor 5. The direction signal on control line 87 is applied to an up/down terminal on the interval counter 85 through an exclusive OR gate 89, and a command direction signal is applied to the other input of the exclusive OR gate 89 through a DIRC control line 190 which is driven by the quad latch 83.

The eight most significant bit outputs of the interval counter 85 are applied to the inputs of a MSB multiplexer 91, and the eight most significant bit outputs (minus one) are connected to the inputs of an LSB multiplexer 90. The three select input terminals on the multiplexers 90 and 91 are driven by the quad latch 83, and they are, therefore, under the control of data output by the microprocessor 35. The output of the MSB multiplexer 91 connects to NAND gate 92 and the output of LSB multiplexer 90 connects through a gate 93 to the other input of NAND gate 92. The output of the NAND gate 92 becomes active and generates an "overflow" signal when the count stored in the interval counter 85 reaches an amount which is determined by the setting of the MSB multiplexer 91. In addition, when a MULT control line 94 is active the count determined by the setting of the LSB multiplexer 90 must also be reached. The angle which the rapid advance motor 5 rotates before the interval counter 85 overflows is thus under program control and may range from 1/2048 to 192/2048 revolutions. Stated yet another way, the number of optical encoder cycles required to produce an interval counter overflow may be controlled by an "interval number" which is output by the microprocessor 35 to the select inputs of the multiplexers 90 and 91.

The overflow signal generated by the NAND gate 92 performs a number of functions. First, the overflow condition sets a J-K flip-flop 95 which generates an "interval" interrupt request signal on an output control line 96. It also resets the interval counter 85 through a NOR gate 97 and activates an INTERVAL control line 98. As will be explained in more detail below, the interval interrupt service routine executed by the microprocessor 35 performs a number of functions, including resetting the interrupt request flip-flop and reading the current value of a timer counter 99. This time interval number is stored in an octal latch 100. These functions are performed by outputting data to the octal latch 80 which is decoded by circuit 82 to enable respective control lines 102 and 101.

The timer counter 99 includes an 11-bit binary counter which is preset shortly after each interval counter overflow by an inverter gate 103. It counts the pulses produced by a prescaler 93. When the MULT control line 94 is inactive the prescaler 93 divides the 2 MHz input clock by two, and when it is active, the prescaler 93 divides the 2 MHz clock by three. The eight most significant digit outputs of the timer counter 99 are connected to the eight inputs to the octal latch 100. When an interval counter overflow occurs, the value of the timer counter 99 is clocked into the octal latch 100 by control line 104, the timer counter 99 is preset by gate 103 and the latched timer value is input to the microprocessor 35 by enabling control line 101. In this manner the "real" time interval required for the rapid advance motor 5 to rotate the angle indicated by the interval number applied to the interval counter 85 through multiplexers 90 and 91 is obtained. This time interval is an indication of motor speed, and hence, slide velocity.

Referring still to FIG. 3A, two additional interrupts are generated for use in control of the slide transfer machine 1. The first of these is a real time clock interrupt which occurs every five milliseconds. This is generated by a divider circuit 105 which is driven by the two megahertz clock. Every five milliseconds a pulse is generated at its output to a control line 106 and is applied through a gate 107 to a J-K flip-flop 108. The flip-flop 108 generates a "5 msec. interrupt" request on line 109, which when granted, vectors the microprocessor 35 to execute a 5 msec. interrupt service routine. This service routine will be described in more detail hereinafter, but one of its functions is to output data to the octal latch 80 which is decoded to generate a "clear interrupt" signal to the flip-flop 108 through control line 110.

The second interrupt is produced by a phase counter 111 which is connected to the encoder circuit 86. Every 32 cycles of the optical encoder 11 the phase counter 111 produces an output pulse which enables a latch circuit 112. One output of the latch 112 generates a "phase interrupt" request signal on an INT1 control line 113 and a second output generates a motor direction signal on a DIR control line 114. The phase interrupt request is cleared on the next 2 MHz clock pulse, and the direction signal may be gated onto the D7 lead in the I/O data bus 55 when the microprocessor 35 performs a read operation and enables decoder control line 68. As will be explained in more detail below, the phase interrupt occurs every time the rapid advance motor rotates 5.6 degrees, and the interrupt service routine which is executed in response to this interrupt outputs updated angle command data to the digital to analog converter circuit 23.

Referring particularly to FIGS. 1 and 3B, the encoder interface and interrupt handler circuit 62 also monitors the absolute position of the slide 2. This is accomplished by accumulating the incremental position feedback signals generated on line 10 by the optical encoder 9. These signals are received at an encoder circuit 120, similar to that described above, and an 18-bit position counter 121 is either incremented or decremented a corresponding amount depending on the direction of slide motion. The position counter 121 may be cleared by the microprocessor system through a CLEAR control line 122 and the sixteen most significant digit outputs of the counter 121 are connected to a bus 123. The position counter 121 is cleared when the slide 2 is placed in a reference position, and its outputs provide a binary number indicative of the absolute position of the slide 2 as it is moved through its operating cycle.

The output of the position counter 121 is applied to the A inputs on a comparator circuit 124 and to the inputs of two position latches 125 and 126. The LSB position latch 125 stores the eight least significant bits of the position and the MSB latch 126 stores the eight most significant bits when clocked by an OR gate 127. This occurs every five milliseconds or every time the interval interrupt occurs, and the contents of the latches can be separately read when a BS LSB control line 128 or BS MSB control line 129 is enabled. In this manner the microprocessor system 30 can read the current absolute position of the slide 2 under control of the programs stored in the read-only memory 46.

The comparator circuit 124 continuously compares the absolute position of the slide 2 with the contents of two 8-bit latches 130 and 131. The inputs to the latches 130 and 131 connect to the extended I/O data bus 55' and data is loaded into the LSB latch 130 when a control line 132 is enabled and data is loaded into MSB latch 131 when a control line 133 is enabled. When the slide position is greater than the position data stored in latches 130 and 131, the comparator 124 generates an output signal on MORE line 134 to one input of a data selector circuit 135. On the other hand, when the slide position is less than this position data stored in latches 130 and 131, an output signal is generated on LESS line 136. When the slide position equals this position, an output signal is generated on EQUAL line 161. As will be described in more detail below, the latches 130 and 131 are loaded with position data which indicates the point at which the deceleration of the slide 2 is to commence.

The data selector 135 operates to output signals to a DECEL control line 160, an OR gate 137 and a pair of J-K flip-flops 138 and 139 when the slide 2 passes through the position indicated in the latches 130 and 131. The DECEL control line 160 resets the interval counter 85 and the timer counter 99 to "synchronize" them to the deceleration process. The output of the OR gate 137 drives the MULT control line 94 which is also latched by the $\bar{Q}$ output of the J-K flip-flop 138. The flip-flop 138 is reset through control line 146. The J-K flip-flop 139 is set by the data selector 135 and its Q output drives a BS INT control line 140. The BS INT control line 140 requests an interrupt, which when serviced by the microprocessor 35, clears the J-K flip-flop 139 through a BS CLR control line 141.

The data selector 135 is controlled through an enable line 142 by an R-S flip-flop 143 and at a pair of data select terminals by DIRC control line 190. When the R-S flip-flop 143 is set by an EN BS INT control line 144, the data selector 135 is enabled. When the R-S flip-flop 143 is reset by OR gate 145, the data selector 135 is disabled. The data selector 135 is disabled after each BS INT request generated by J-K flip-flop 139 and each time new data is loaded into the LSB latch 130. When the data selector 135 is enabled, the direction of slide motion is indicated on DIRC control line 190 which selects whether the signal on LESS line 136 and EQUAL line 161 or MORE line 134 and EQUAL line 161 will control the output of the data selector 135. For example, when moving in the positive direction (away from home) the MORE line 134 and EQUAL line 160 are selected and a BS INT interrupt request is generated when the position count is more than or equal to the position indicated by latches 130 and 131. The DECEL control line 160 then indicates that deceleration of the slide 2 is beginning and MULT control line 94 is latched "on" to indicate that the system is in the deceleration process.

Referring still to FIG. 3B, the three interrupt request control lines 96, 109 and 140 along with an ESTOP interrupt request line 148 connect to an interrupt priority encoder 149. The ESTOP line 148 is driven by an R-S flip-flop 151 which has its set input connected to a line 152 that indicates when an emergency stop is required. The ESTOP interrupt request is cleared by control line 150 which drives the reset input to R-S flip-flop 151. The priority encoder 149 processes the four interrupt requests and generates a corresponding signal on the interrupt request line INT2 48. Table B indicates the priority of the interrupt requests when more than one occurs at the same time.

| INT1 | Phase interrupt (line 113) |
|------|----------------------------|
| INT2 | Emergency stop (line 148) |
|      | Interval interrupt (line 96) |
|      | BS interrupt (line 140) |
|      | 5 msec. interrupt (line 109) |

Figure 4:
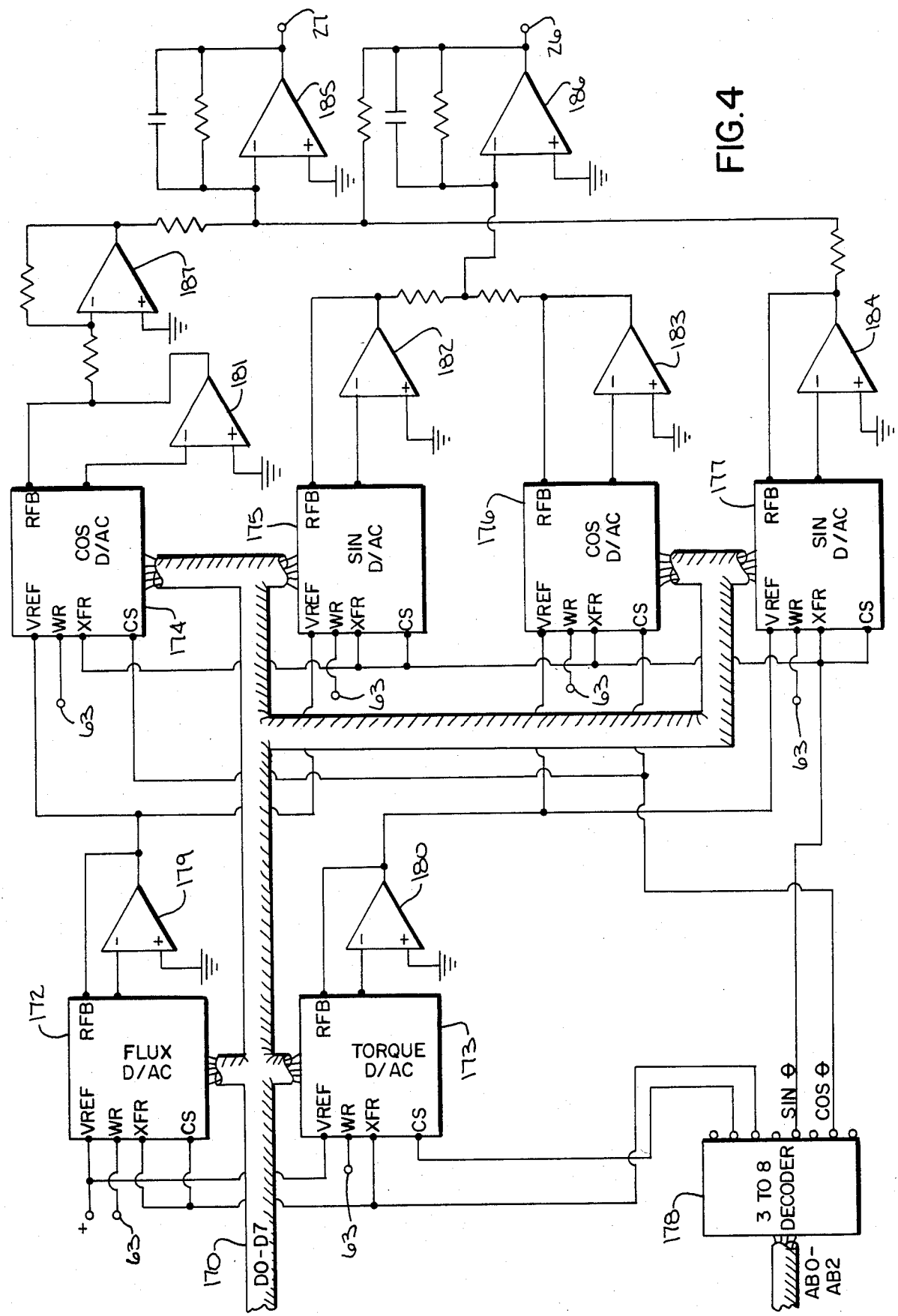
FIG. 4 is an electrical schematic diagram of the digital to analog converter circuit which forms part of the control system of FIG. 1.

Referring particularly to FIGS. 1 and 4, the digital to analog converter circuit 23 receives 8-bit bytes of data from the microprocessor system 30 through a data bus 170 and three select bits AB0-AB2. The write control line (WR) 63 is also employed by the circuit 23 to load the data on the bus 170 into one of six 8-bit D/A converters 172-177. The selection of which D/A converter 172-177 is to receive the data is determined by the select lines AB0-AB2.

The circuit 23 periodically receives five digital command words. The first of these is an 8-bit flux command which is loaded into the FLUX D/A converter 172 to produce a corresponding analog signal at the output of an operational amplifier 179 which indicates the amount of motor flux required by the rapid advance motor 5. Similarly, an 8-bit torque command is loaded into the TORQUE D/A converter 173 to produce a corresponding analog signal at the output of an operational amplifier 180 which indicates the amount of torque required by the rapid advance motor 5. The remaining two command signals indicate a reference angle ($\theta$). The first 8-bit command is the sine of this angle (SIN $\theta$) and the second is the cosine of this angle (COS $\theta$). The SIN $\theta$ command is loaded into SIN D/A converters 175 and 177 and the COS $\theta$ command is loaded into the COS D/A converters 174 and 176. The analog flux command signal is applied to the reference input on D/A converters 174 and 175 and the analog torque command signal is applied to the reference input on D/A converters 176 and 177. The analog output signal from operational amplifier 181 is proportional to the product of the commanded motor flux and COS $\theta$ and the output of operational amplifier 182 is proportional to the product of the commanded motor flux and SIN $\theta$. Similarly, the analog output signal from operational amplifier 183 is proportional to the product of the commanded motor torque and COS $\theta$ and the output of operational amplifier 184 is proportional to the product of commanded motor torque and sin $\theta$. The outputs of amplifier 182 and 183 are summed by operational amplifier 186 to provide the current command signal on line 26 (Io COS ($\theta-\phi$)). The output of amplifier 181 is inverted by amplifier 187, and the outputs of amplifiers, 187, 184 and 186 are summed by operational amplifier 185 to provide the current command signal on line 27 (Io COS ($\theta-\phi-120°$)). As described above, these two current command signals drive the pulse width modulators 19 and 20 to control the speed and torque of the rapid advance motor 5.

SYSTEM OPERATION

Referring particularly to FIGS. 1 and 5A, the microprocessor system 30 is programmed to move the slide 2 from its home position shown in FIG. 5A to a work piece 200 using the rapid advance motor 5. Although this portion of the machine's operating cycle is necessary, it is non-productive. It is an objective of the present invention to minimize the time required to make this rapid traverse move.

The control system of the present invention accomplishes this by first accelerating the slide 2 at the maximum rate possible until the desired rapid traverse velocity is reached. This acceleration portion of the move is indicated by the curve 201 in FIG. 5A, and depending on the condition of the machine 1 and its control, curve 201 may change from cycle to cycle. Such a change is indicated by curve 201A in which the acceleration is not as great. Such changes may occur from cycle to cycle due to such factors as fluctuation in line voltage or obstructions. The change in acceleration capability may also occur over a longer time span due to such factors as machine wear and temperature.

During the acceleration portion of each cycle the control system stores data which indicates the machine's capability. Such data includes the distance ($\Delta D$) required to accelerate the slide 2 to the desired velocity, as well as a table of numbers which represent the velocity of the slide 2 at selected positions during acceleration.

The acceleration distance ($\Delta D$) is employed to determine when the slide 2 should begin deceleration if it is to come to rest at the work piece 200. In the preferred embodiment this distance is multiplied by 1.5 to assure that the system has ample room in which to decelerate although it should be apparent that this factor may be altered depending upon the circumstances. The deceleration distance (1.5$\Delta D$) is subtracted from the end point of the rapid advance move to yield the absolute machine position at which the deceleration process should commence. When the slide 2 reaches this deceleration point, a sequence is initiated which brings the slide 2 to a halt at the work piece 200.

During the deceleration process the table of velocity numbers stored during the acceleration portion of the move are employed to bring the slide 2 to a smooth stop at the end point. Referring particularly to FIGS. 1, 5B and 5C, the slide velocity is determined during acceleration by measuring the time required to travel fixed incremental distances (d). The distance (d) is measured by the interval counter 85 (FIG. 3A), and the time ($\Delta T$) required to travel this distance is measured by the timer counter 99 (FIG. 3A). The measured time intervals are stored sequentially ($\Delta T1$, $\Delta T2$ ... $\Delta Tn$) in a velocity table 202 which forms part of the RAM memory 51 in the microprocessor system 30. During deceleration these values are read out in reverse order and employed to control slide velocity during an interval of travel. In other words, a mirror image of the stored velocity profile is reproduced during deceleration.

The deceleration velocity profile is expanded by the 1.5 "assurance" factor. Although this could be accomplished in software, in the preferred embodiment it is accomplished by the hardware in the encoder interface circuit (FIG. 3A). More specifically, when deceleration starts the MULT control line 94 is enabled to alter the interval counter 85 and the prescaler 93. For example, if the MSB multiplexer 91 is set by the quad latch 83 to require that a distance (d) be traversed before an interval interrupt is produced by the counter 85, the LSB multiplexer 90 is set to require a 0.5d output from the interval counter 85. These outputs are summed by the NAND gate 92 to produce an interval interrupt when the slide 2 moves 1.5d. Thus, when a value is read from the velocity table 202 and used to control velocity over a distance (d), the slide 2 actually moves 1.5d before the next value is read and a new velocity established.

The prescaler 93 is also altered by the MULT control line 94 to produce times which are multiplied by the 1.5 assurance factor. The alteration of measured time is required because it is needed to calculate slide velocity for feedback purposes. Although this multiplication could be performed by the microprocessor 35, it is more expedient in the preferred embodiment to alter the prescaler 93 modules to accomplish the same result.

Referring particularly to FIGS. 1, 3A and 5A, as the slide 2 accelerates and the velocity increases, the time interval required to travel the distance (d) drops. Because the microprocessor 35 is interrupted from other processing each time the interval counter 85 produces an output, the interrupt rate increases with velocity and soon becomes an excessive burden on the microprocessor 35. One important aspect of the present invention is a means for adjusting the resolution of the incremental position feedback system so that the time interval between interrupts remains within manageable limits.

Referring still to FIGS. 1, 3A and 5A, the distance (d) which the slide 2 must move before the interval counter 85 produces an interval interrupt is determined by the multiplexers 90 and 91. The 3-bit interval number stored in the quad latch 83 operates the MSB multiplexer 91 to select one of the eight most significant outputs of the 10-bit interval counter 85. When the slide 2 cycles the optical encoder 11 a sufficient number of times, a "one" is output from the selected counter output and is applied by the MSB multiplexer 91 to the NAND gate 92. The interval counter 85 is a binary counter, and as a result, if the least significant counter output which is applied to the MSB multiplexer 91 goes high when a distance (d) is traversed, then the distances 2d, 4d, 8d, 16d, 32d, 64d and 128d must be traversed to generate signals at the other outputs. By writing appropriate 3-bit interval numbers to the quad latch 83, therefore, the resolution of the incremental position feedback circuitry may be selected under control of the microprocessor 35.

As shown graphically in FIGS. 5B and 5C, this ability to control the position feedback circuitry resolution is employed during the acceleration of the slide 2. During the initial part of the acceleration the resolution is set to maximum and an interval interrupt occurs each distance (d). During subsequent interval interrupts, the counter timer 99 is read, and the time interval ($\Delta T$) required to travel this distance (d) is stored in the velocity table 202. As the slide velocity increases the measured time intervals $\Delta T$ become shorter, and when a lower limit is reached, the microprocessor system 30 reduces the resolution of the position feedback circuitry by outputting a new interval number. As a result, the distance traveled between interval interrupts doubles (2d) and the time intervals ($\Delta T$) increase. The process continues with the resolution of the position feedback circuitry being reduced until the velocity reaches its peak value and no further reduction is required to maintain acceptable interrupt intervals $\Delta T$. By altering the position feedback circuit resolution in this manner, the range of time intervals $\Delta T$ is maintained between 1.25 milliseconds to 2.5 milliseconds.

The velocity at which the slide 2 is moving may be calculated by dividing the distance traveled (d, 2d, 4d etc.) by the measured time interval $\Delta T$. Although these calculations may be performed and velocity numbers (V1, V2, V3 ... Vn) stored in the velocity table 202, such calculations are time consuming. Instead, the time intervals ($\Delta T$) may be read from the table 202 and used as a pointer into a look-up table 203 which stores a set of "uncompensated" velocity numbers. The uncompensated velocity number is then multiplied by a series of shift operations which correspond with the value of the interval number used to set position feedback circuitry resolution. For example, if the time interval $\Delta T8$ is measured when the feedback circuitry is set to measure an incremental distance of 4d, the uncompensated velocity number read from the look-up table 203 is shifted left two places to multiply the value by four.

It should be apparent that a number of advantages flow from the position feedback circuit of the present invention. By controlling intervals between position feedback interrupts, the system can maintain a desired position resolution at all velocities with a single incremental position feedback transducer. In addition, the time intervals between position feedback interrupts is maintained within a reasonable range. This latter feature insures that the control system is not overburdened by excessive interrupts from the position feedback circuit at high machine velocities, and it reduces the size of the look-up table required to directly convert time intervals to velocity. Also, a quantization error normally associated with fixed frequency sample data systems is eliminated. In such prior systems, the exact position within the finest transducer interval is not known at the sampling instant, whereas, in the preferred embodiment of the present invention the time interval between interval transitions is measured. As a result, transducer resolution does not affect the accuracy of each velocity measurement.

In the preferred embodiment another feature is employed to further reduce the size of the velocity profile stored in the velocity table 202. More specifically, at higher velocities (at a given acceleration) the percentage change in slide velocity between interval interrupts becomes smaller and eventually insignificant changes in torque are required during deceleration to track the stored profile with sufficient accuracy. Consequently, at higher velocities a number of interval interrupts are allowed to occur before making an additional entry into the velocity table. The number of intervals is determined by a counter (CNTR) which is preset after each entry is made to the velocity table 202. The value to which this counter (CNTR) is preset is determined by the current slide velocity.

The above functions are carried out under the direction of programs stored in the PROM 46. The program instructions are in machine language and they are read out in sequence by the microprocessor 35 and executed to perform the control functions.

Referring particularly to FIG. 6, when the control system is powered up a sequence of instructions is executed as indicated by process block 210 to initialize the hardware elements of the microprocessor system 30 and the data structures stored in the RAM memory 51. The interrupts INT1 and INT2 are then enabled as indicated by process block 211 and the system then idles in a loop which performs some test functions on the system elements as indicated by process block 212. As will now be described, the microprocessor system 30 is primarily "interrupt driven" in that the various control functions are carried out by interrupt service routines which are executed in response to interrupt requests.

Figure 7:
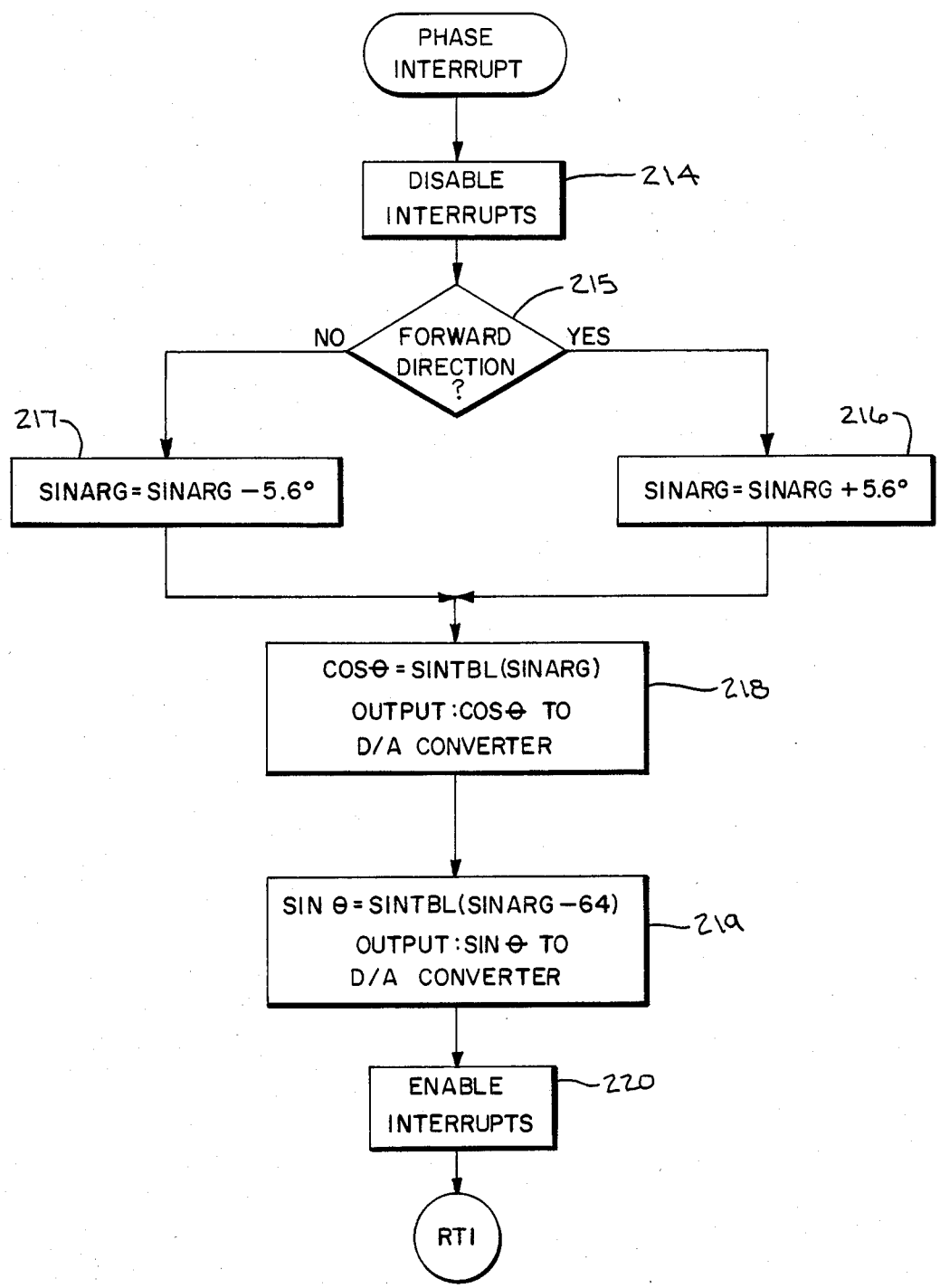
FIG. 7 is a flow chart of the phase interrupt service routine executed by the microprocessor of FIG. 2.

Referring particularly to FIG. 7, a phase interrupt occurs each time the rotor on rapid advance motor 5 rotates 5.6 degrees. The phase interrupt service routine first disables all interrupts as indicated by process block 214 and it then determines motor direction as indicated by decision block 215. If the motor 5 is rotating in the forward direction a variable "SINARG" is updated to reflect the addition of 5.6 degrees of rotation as indicated by process block 216. If the motor 5 is rotating in the reverse direction, the SINARG is updated to reflect a negative 5.6 degrees of mechanical motion as indicated by process block 217, and in either case the new value of SINARG is then employed to derive new values for SIN $\theta$ and COS $\theta$ which determine the orientation of the stator winding flux vector.

As described in U.S. Pat. No. 4,266,176 the values for SIN $\theta$ and COS $\theta$ are read from a table (SINTBL) of values which represent the magnitude of a sine wave at successive angles ($\theta$). This table (SINTBL) is stored in the PROM memory 46 and the variable (SINARG) is employed as an index into this table. As indicated by process block 218 the value of COS $\theta$ is read from the table (SINTBL) and is output to the digital to analog converter circuit 23. The same table (SINTBL) is employed to derive SIN $\theta$, as indicated by process block 219, however, an offset of "64" is subtracted from the index (SINARG) to provide the ninety degree phase difference. The value for SIN $\theta$ is output to the digital to analog converter 23 and the phase interrupt service routine is exited after enabling interrupts, as indicated by process block 220.

It should be apparent from the above description that the phase interrupt service routine functions to repeatedly advance the rotating magnetic field produced by the stator winding of the rapid advance motor 5. This advance, or rotation, is performed in increments of 5.6 degrees, and the rate is determined by current motor speed.

Figure 8A:
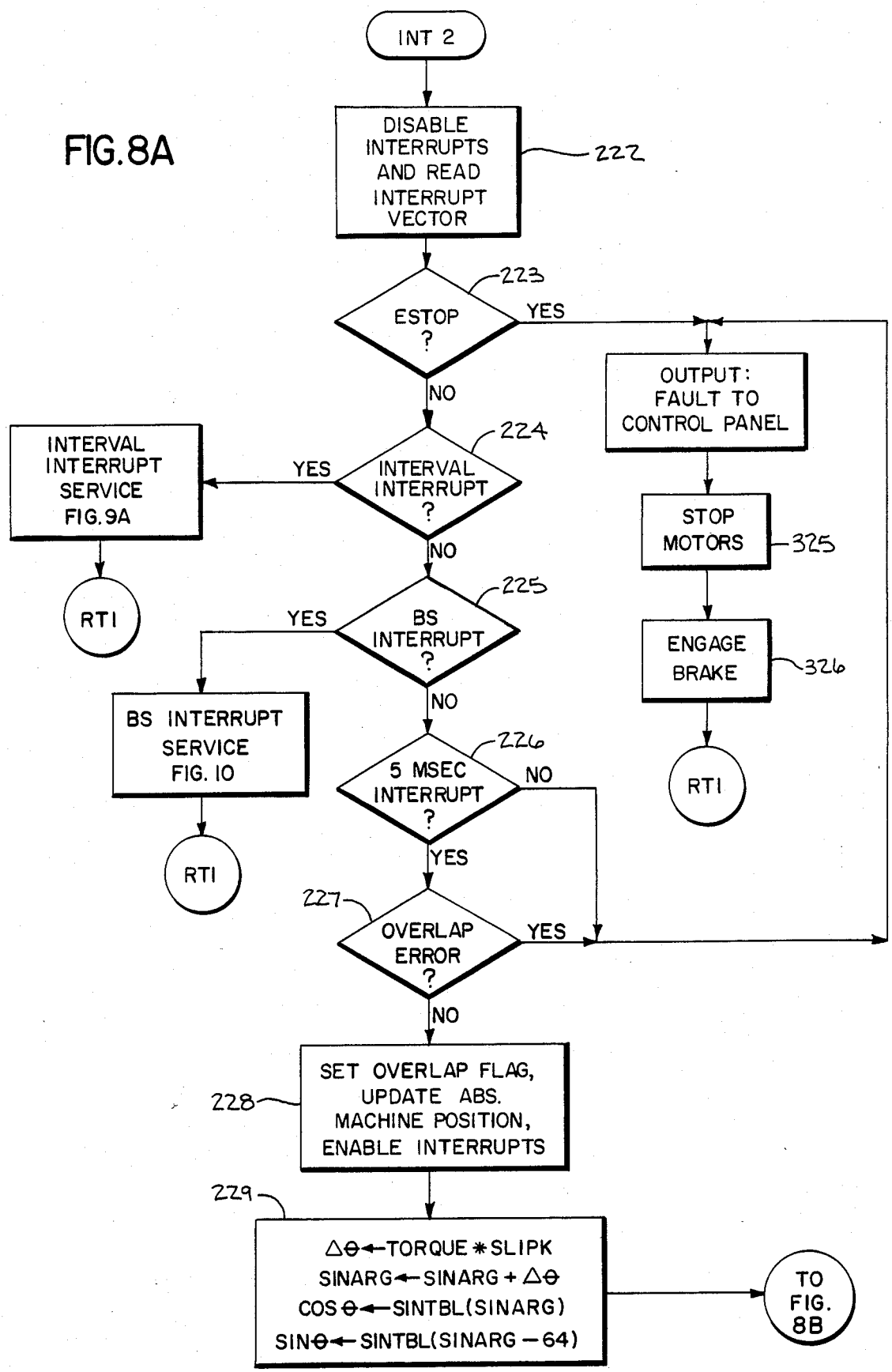
FIGS. 8A and 8B are a flow chart of an interrupt service routine executed by the microprocessor of FIG. 2.

Referring particularly to FIG. 8A, when an interrupt is requested on control line INT2, other interrupts are disabled and the interrupt vector is read from the interrupt priority encoder 149 (FIG. 3B) as indicated by process block 222. If an emergency stop is requested, as determined by decision block 223, the system branches to process blocks 325-326 which stop the motors 5 and 6, engage the brake 8 and output fault indications to the control panel 31. On the other hand, if an interval interrupt is requested, as determined by decision block 224, the system branches to an interval interrupt service routine which will be described in more detail below. Likewise, if a BS interrupt is requested, as determined at decision block 225, the system branches to a BS interrupt service routine which will be described in more detail below.

Referring still to FIG. 8A, every five milliseconds an interrupt request is generated by divider 105 (FIG. 3A). This is determined at decision block 226 and a check is then made at decision block 227 to determine if the previous 5 msec. interrupt request was completed. If so, the overlap flag is set for the current interrupt as indicated by process block 228, and the current slide position is read from the position latches 125 and 126 (FIG. 3B). The interrupts are then enabled and a number of calculations are performed as indicated by process block 229. More specifically a value ($\Delta\theta$) is calculated to advance the stator winding magnetic field an amount which will provide the desired rapid advance motor torque and slip. This value ($\Delta\theta$) is then added to the variable SINARG, which is employed as described above, to read out values for COS $\theta$ and SIN $\theta$ from the SINTBL.

Figure 8B:
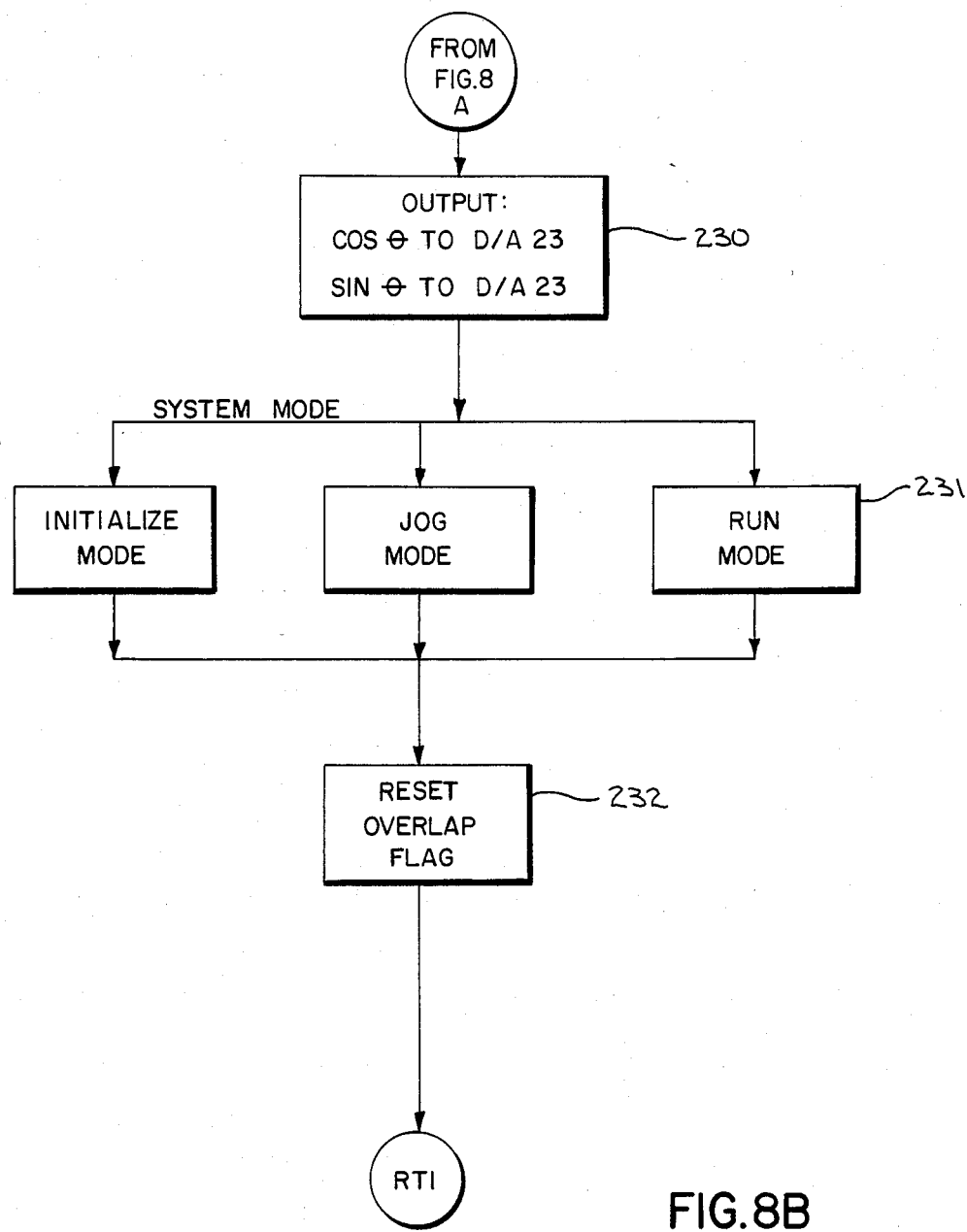

Referring particularly to FIG. 8B, the updated values of COS $\theta$ and SIN $\theta$ are then output to the digital to analog converter circuit 23 as indicated by process block 230. The functions performed next are determined by the mode of operation of the control system. When in the initialization mode, the slide transfer machine is cycled through a sequence of steps which establish such mechanical parameters as "home" position, gear ratios, feed rate and end stop position. When in the jog mode, the control system is responsive to commands entered through the control panel 31 to move the slide 2 to indicated positions. Such functions form no part of the present invention and will not be discussed in detail.

When in the "run" mode, instructions indicated by process block 231 establish the initial values for rapid advance motor speed and torque, release the brake 8 and begin the rapid traverse. As indicated by process block 232, the overlap flag is then reset to indicate that the 5 msec. interrupt has been serviced. The 5 msec. interrupt is then completed by returning to the interrupted routine.

It should be apparent from the above description that every five milliseconds the control system advances the magnetic field produced by the rapid advance motor stator windings to provide the desired motor flux and slip. In addition, the absolute machine position is updated for use by other processes and motor flux calculations are performed.

Figure 9A:
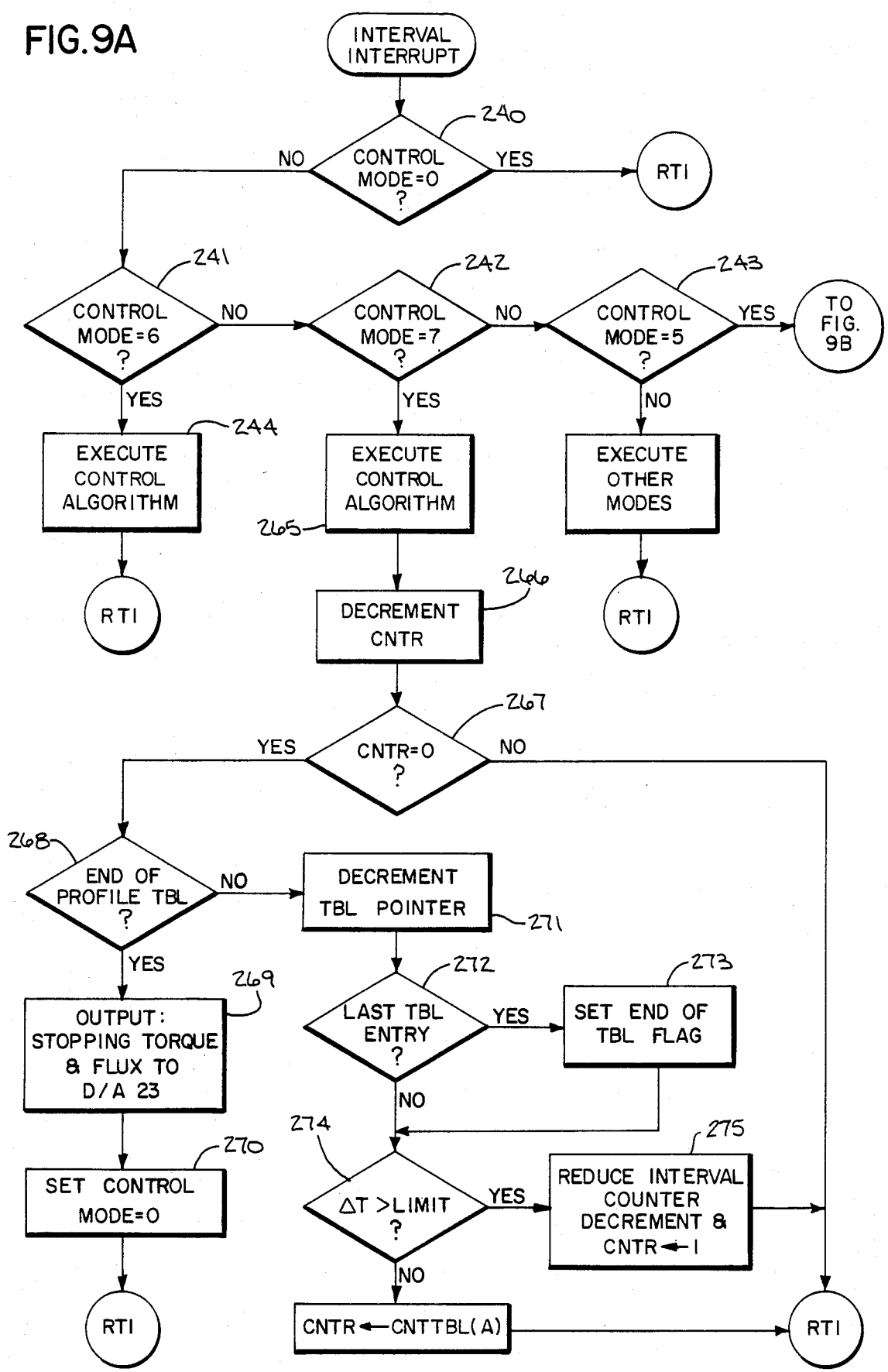

Referring particularly to FIG. 9A, each time an interval interrupt is produced by the position feedback circuitry the interval interrupt service routine is executed. A set of instructions are first executed to establish the control mode, as indicated by decision blocks 240-243. The following discussion will concentrate on control mode 5 which is the acceleration portion of the rapid traverse motion and control mode 7 which is the deceleration portion of the move. Mode 6 is the constant velocity portion of the rapid traverse motion in which a control algorithm is executed as indicated by process block 244. This control algorithm computes the difference between the measured and commanded velocity and generates a commanded torque proportional to this error plus the time integral of this error.

Referring particularly to FIG. 9B, during acceleration of the rapid advance motor 5, the system is in control mode 5 in which full motor torque is generated and the velocity profile is developed. As indicated by process block 245, the first function performed after each interval interrupt is to update the distance required to decelerate the slide 2 to a stop. This distance (DECELD) is calculated by accumulating incremental distances (SDIST) which are each equal to 1.5 times the current incremental feedback distance. The counter (CNTR) is then decremented as indicated by process block 246 and it is checked at decision block 247 to determine if it is zero. As indicated previously, the counter (CNTR) is employed to reduce the number of entries into the velocity table 202 at higher speeds, and when it is counted down to zero, the time interval ($\Delta$Tn) is read from the octal latch 100 and stored in the velocity table 202, as indicated by process block 248. In addition, a new value for the counter (CNTR) is looked up in a table (CNTIBL) which is stored in PROM memory 46.

As indicated by process block 249, the value of a target end point is calculated next and stored in a RAM memory location (TEMP). This target end point is calculated by adding the current slide position obtained from latches 125 and 126 (FIG. 3B) with the current deceleration distance (DECELD) plus a small safety margin. This calculated value (TEMP) is then compared with the desired end point of the rapid traverse motion, as indicated by decision block 250, and if it is equal to or greater than the desired end point, acceleration is to be terminated. As indicated by decision block 251, acceleration is also to be terminated when the rapid advance motor 5 reaches its programmed rapid traverse velocity. In either case, $\Delta T_n$ is utilized to obtain the commanded velocity when control mode 6 is entered, the value of CNTR is adjusted for use during control mode 7, the BS interrupt is enabled (flip-flop 143 in FIG. 3B), the position at which deceleration is to begin (END POINT-DECELD) is output to latches 130 and 131 (FIG. 3B), and the control mode is switched to "6" to indicate the constant velocity portion of the rapid traverse. As shown in process block 252, torque is then calculated for the desired velocity and is output to the digital to analog converter circuit 23 as indicated by process block 253.

If acceleration is to continue as determined at decision blocks 250 and 251, a check is made at decision block 255 to determine if the resolution of the position feedback circuit should be reduced. This is accomplished by comparing the most recent time interval ($\Delta$Tn) with a lower time limit (1.25 milliseconds). If less, the resolution of the position feedback circuit is reduced by outputting a larger interval number to the quad latch 83 (FIG. 3A) which doubles the count accumulated by the interval counter 85 before the next interval interrupt occurs. As indicated at process block 256, the incremental distance (SDIST) is also doubled to reflect the change in incremental feedback signal and a variable (A) is incremented and the counter (CNTR) is set to one. The variable (A) is employed as an index into the table (CNTTBL) used to set the counter value (CNTR) as described above.

Referring particularly to FIGS. 3B and 9A the system remains in the constant velocity portion of the rapid traverse (mode 6) until a BS interrupt occurs. As indicated above, this occurs when the slide 2 reaches the deceleration point (END POINT-DECELD) stored in latches 130 and 131. This event is detected by the comparator 124.

Referring particularly to FIG. 10, when the BS interrupt service routine is executed, a number of functions are performed to begin the deceleration. As indicated by process block 260, these include calculating values for motor flux and maximum motor decelerating torque, and for setting the motor velocity to the value indicated by the last entry in the velocity table 202. The flux and torque commands are then output to the digital to analog converter 23 to start decelerating as indicated by process block 261. The control mode is then set to "7", as indicated by process block 263, and the interrupt service routine is exited after enabling interrupts.

Referring again to FIG. 9A, when the next interval interrupt occurs the system is in control mode 7 and it branches at decision block 242. The control algorithm is then executed by process block 265 to close the velocity loop, and the counter (CNTR) is decremented, as indicated by process block 266. When the counter (CNTR) is not zero, as determined at decision block 267, the interrupt service is completed. Otherwise, a check is made at decision block 268 to determine if the final entry from the velocity table 202 has been processed and deceleration is completed. If so, a stopping flux and torque is calculated and output to the digital to analog circuit 23, as indicated at process block 269. The control mode is then set to "0", as indicated at process block 270, and the interrupt service is terminated. Mode "0" is a "NUL" mode in which no functions are performed when an interval interrupt occurs.

During the deceleration process the values ($\Delta$Tn) stored in the velocity table 202 are read out in reverse order and employed to control motor velocity. Referring particularly to FIG. 9A, when the counter (CNTR) is zero the velocity table pointer (TBL) is decremented at 271 to read the next value $\Delta T(n-1)$ from the table 202 and a check is made at decision block 272 to determine if the final entry has been reached. If so, the end of table flag is set, as indicated at 273. In either case, the value of the current velocity table entry ($\Delta T(n-1)$) is checked against the lower limit (1.25 milliseconds) at decision block 274 to determine if the resolution of the position feedback circuit should be increased. If so, a reduced interval number is output to quad latch 83 (FIG. 3A) which reduces the distance required to produce an interval interrupt. As shown at process block 275, the variable A is also reduced to reflect the lower motor velocity and the counter (CNTR) is set to "1". If the upper limit has not been reached, as determined at decision block 274, the counter (CNTR) is preset to the value from table (CNTTBL) which is appropriate for the current velocity. The deceleration continues to count down the counter (CNTR) and use each entry in the velocity table 202 to control velocity.

It should be apparent that the above described invention may be employed in many different motor control systems. While a slide transfer machine is disclosed herein, the invention can also be applied to other machines which have movable elements. In addition, while the preferred embodiment employs an induction motor, other types of a.c. and d.c. electric motors can be used to drive the movable machine element, as well as non electric motors which operate pneumatically or hydraulically.

Component Appendix

| Component | Description |
| --- | --- |
| Microprocessor 35 | 8-bit microprocessor model Z-80 manufactured by Zilog |
| CTC 43 | Counter timer circuit for model Z-80 manufactured by Zilog |
| PROM 46 | 2K × 8 bipolar PROM, tristate output model 82S191 manufactured by Signetics, Inc. |
| RAM 51 | 4K × 1 CMOS static RAM model HM-6504 manufactured by Harris Corporation |
| Gates 57 | Octal bi-directional buffers/ line drivers 8304 manufactured by National Semiconductor, Inc. |
| D/A interface 56 | Three quad high speed differential line drivers Am26LS31 manufactured by Advanced Micro |

Component Appendix-continued

| Component | Description |
|---|---|
| | Devices, Inc. |
| Control panel interface 61 | Two octal D-type latches model SN74LS374, two quad differential line receivers Am26LS32, and one quad differential line driver Am26LS31. |
| Octal latches 80 & 100 | Octal D-type latches model SN74LS374 manufactured by Texas Instruments, Inc. |
| Quad Latch 83 | One 4-bit universal shift register SN74LS194 manufactured by Texas Instruments. |
| Multiplexers 90, 91 & 135 | Data selector/multiplexer SN74LS151 manufactured by Texas Instruments, Inc. |
| Interval counter 85 | Three synchronous 4-bit binary up-down counters Am74LS669 manufactured by Advanced Micro Devices, Inc. |
| phase counter 111 | Three Am74LS669 4-bit counters. |
| prescaler 93 | One Am74LS669 4-bit counters. |
| timer counter 99 | Three Am74LS669 4-bit counters. |
| divider 105 | Four Am74LS669 4-bit counters. |
| latches 130, 131, 125 and 126 | Octal D-type latch model SN74LS374 manufactured by Texas Instruments, Inc. |
| comparator 124 | Four 4-bit magnitude comparators SN74LS85 manufactured by Texas Instruments. |
| position counter 121 | Five Am74LS669 4-bit counters. |
| D/A converters 172-177 | 8-bit microprocessor compatible double buffered D to A converter model DAC0832 manufactured by National Semiconductor, Inc. |
| operational amplifiers 179-187 | JFET - input operational amplifier model TL084ACN manufactured by Texas Instruments, Inc. |

We claim:

1. A control system for a movable element on a machine, the combination comprising:
   a motor coupled to the movable element for moving the same;
   a motor control coupled to the motor to operate it in response to a motion command signal;
   acceleration control means coupled to the motor control for generating motion signals which accelerate the movable element from a start position to a rapid traverse velocity and which includes:
   (a) velocity table storage means, and
   (b) means for storing numbers in the velocity table storage means, which numbers are indicative of the motion generated by the acceleration control means during successive portions of the acceleration;
   indicating means coupled to the motor control for sensing the velocity of the movable element and providing an indication when rapid traverse velocity is reached;
   distance measuring means coupled to the movable element for indicating the distance traveled from its start position;
   means enabled by the indicating means and coupled to the motor control for generating motion command signals which move the movable element at the rapid traverse velocity;
   calculating means coupled to the indicating means and the distance measuring means for calculating a deceleration position which is a function of the distance traveled by the movable element during its acceleration from the start position to the position at which it reached rapid traverse velocity; and
   deceleration control means coupled to the distance measuring means and the calculating means for generating motion command signals to the motor control which decelerate the movable element from its rapid traverse velocity when the movable element reaches the calculated deceleration position, and in which
   the deceleration control means includes means for reading successive numbers from the velocity table storage means to generate motion command signals during the deceleration of the movable element.

2. The control system as recited in claim 1 in which each number stored in the velocity table storage means is indicative of the time interval required for a present increment of motor motion.

3. The control system as recited in claim 2 in which the present increment of motor motion is altered by the means for storing numbers in the velocity table storage means to increase the present increment as the velocity of the movable element increases.

4. The control system as recited in claim 1 in which the deceleration control means alters each number read from the velocity table storage means to alter the deceleration profile of the movable element from its acceleration profile.

5. An incremental position feedback system which comprises:
   transducer means for generating a succession of feedback signals, each feedback signal being indicative of a fixed increment of distance;
   counter means for receiving the feedback signals and accumulating a count which is indicative of the number of received feedback signals;
   selector means coupled to the counter means and being operable in response to an interval number received at its select inputs to select an accumulated count in the counter means which will generate an interval output signal;
   timer means for measuring the time interval between generated interval output signals; and
   adjustment means coupled to the timer means and being operable to generate an interval number to the selector means, the generated interval number being altered when the measured time interval drops below a minimum level and the generated interval number being altered when the measured time interval increases above a maximum level, whereby the resolution of the incremental position feedback system is automatically reduced at higher velocities and automatically increased at lower velocities.

6. The incremental position feedback system as recited in claim 5 which includes means for calculating velocity that comprises:
   a look-up table for storing a set of uncompensated velocity numbers;
   first calculator means coupled to receive the measured time interval, and in response thereto, read a corresponding uncompensated velocity number from the look-up table; and
   second calculator means coupled to the first calculator means and to the adjustment means for altering the value of the uncompensated velocity number read from the look-up table by an amount determined by the generated interval number.

7. A control system for an induction motor, the combination comprising:
 motor drive means responsive to a command signal (SIN $\theta$) to provide an armature current $I_o$ (SIN $\theta$) which is applied to the induction motor;
 table storage means (SINTBL) for storing values of SIN for successive values of $\theta$;
 means for storing an index (SINARG);
 output means responsive to the value of the index (SINARG) to read a value from the table storage means (SINTBL) and output the same as a command signal (SIN $\theta$) to the motor drive means;
 phase interrupt means coupled to the induction motor and the index storage means, and being operable each time the induction motor rotates a preselected means ($\Delta\theta_1$) to change the stored index (SINARG) by a corresponding amount;
 timed interrupt means coupled to the index storage means and being operable to periodically change the stored index (SINARG) by an amount ($\Delta\theta_2$) which is determined by the desired motor torque and slip.

8. The control system as recited in claim 7 in which the output means operates each time the phase interrupt means changes the stored index (SINARG).

9. The control system as recited in claim 8 in which the output means operates each time the timed interrupt means changes the stored index (SINARG).

* * * * *